US006328217B1

(12) United States Patent
Everett et al.

(10) Patent No.: US 6,328,217 B1
(45) Date of Patent: Dec. 11, 2001

(54) INTEGRATED CIRCUIT CARD WITH APPLICATION HISTORY LIST

(75) Inventors: David Barrington Everett, East Sussex; Stuart James Miller, Berks; Anthony David Peacham, Kent; Ian Stephen Simmons, Cambs; Timothy Philip Richards, Herts; John Charles Viner, Windelsham, all of (GB)

(73) Assignee: Mondex International Limited, London (GB)

( * ) Notice: Subject to any disclaimer, the term of this patent is extended or adjusted under 35 U.S.C. 154(b) by 0 days.

(21) Appl. No.: 09/078,031

(22) Filed: May 13, 1998

Related U.S. Application Data

(60) Provisional application No. 60/046,514, filed on May 15, 1997, and provisional application No. 60/046,543, filed on May 15, 1997.

(51) Int. Cl.[7] ....................................................... G06K 19/06
(52) U.S. Cl. ............................................. 235/492; 235/380
(58) Field of Search .................................... 235/379, 380, 235/492; 705/41

(56) References Cited

U.S. PATENT DOCUMENTS

| 4,214,230 | 7/1980 | Fak et al. . |
| 4,218,582 | 8/1980 | Hellman et al. . |
| 4,259,720 | 3/1981 | Campbell . |
| 4,302,810 | 11/1981 | Bouricius et al. . |
| 4,305,059 | 12/1981 | Benton . |
| 4,321,672 | 3/1982 | Braun et al. . |
| 4,341,951 | 7/1982 | Benton . |
| 4,405,829 | 9/1983 | Rivest et al. . |
| 4,408,203 | 10/1983 | Campbell . |
| 4,423,287 | 12/1983 | Zeidler . |
| 4,442,345 | 4/1984 | Mollier et al. . |
| 4,453,074 | 6/1984 | Weinstein . |

(List continued on next page.)

FOREIGN PATENT DOCUMENTS

| 0152024 | 8/1985 | (EP) . |
| 0157303 | 10/1985 | (EP) . |

(List continued on next page.)

OTHER PUBLICATIONS

Davies et al., "Security for Computer Networks: An Introduction to Data Security in Teleprocessing and Electronic Funds Transfer," John Wiley & Sons 1984.

Primary Examiner—Mark Tremblay
(74) Attorney, Agent, or Firm—Baker Botts L.L.P.

(57) ABSTRACT

There is provided an integrated circuit card for loading an application copy thereon and a method of loading an application copy onto the integrated circuit card, wherein the application copy is one of a plurality of copies of an application. The application copy has an associated application identifier that uniquely identifies the application from other applications and an application copy number that is unique for each copy of the application. The integrated circuit card includes a microprocessor and a memory coupled to the microprocessor. The memory includes an application history list area for storing application identifiers and application copy numbers of applications that have been previously loaded onto the integrated circuit card. The method includes receiving by the integrated circuit card the application copy, the application identifier, and the application copy number; determining by the integrated circuit card whether the application identifier and the application copy number are contained in the application history list area; and failing to load the application copy by the integrated circuit card if the application identifier and the application copy number are contained in the application history list area.

5 Claims, 8 Drawing Sheets

U.S. PATENT DOCUMENTS

| | | |
|---|---|---|
| 4,467,139 | 8/1984 | Mollier . |
| 4,498,000 | 2/1985 | Decavele et al. . |
| 4,536,647 | 8/1985 | Atalla et al. . |
| 4,578,530 | 3/1986 | Zeidler . |
| 4,605,820 | 8/1986 | Campbell, Jr. . |
| 4,629,872 | 12/1986 | Hällberg . |
| 4,630,201 | 12/1986 | White . |
| 4,650,978 | 3/1987 | Hudson et al. . |
| 4,669,596 | 6/1987 | Capers et al. . |
| 4,705,211 | 11/1987 | Honda et al. . |
| 4,709,136 | 11/1987 | Watanabe . |
| 4,709,137 | 11/1987 | Yoshida . |
| 4,727,243 | 2/1988 | Savar . |
| 4,727,244 | 2/1988 | Nakano et al. . |
| 4,731,842 | 3/1988 | Smith . |
| 4,734,568 | 3/1988 | Watanabe . |
| 4,736,094 | 4/1988 | Yoshida . |
| 4,742,215 | 5/1988 | Daughters et al. . |
| 4,745,267 | 5/1988 | Davis et al. . |
| 4,746,788 | 5/1988 | Kawana . |
| 4,748,557 | 5/1988 | Tamada et al. . |
| 4,748,668 | 5/1988 | Shamir et al. . |
| 4,752,677 | 6/1988 | Nakano et al. . |
| 4,755,660 * | 7/1988 | Nakano ................................ 235/380 |
| 4,757,185 | 7/1988 | Onishi . |
| 4,757,543 | 7/1988 | Tamada et al. . |
| 4,759,063 | 7/1988 | Chaum . |
| 4,759,064 | 7/1988 | Chaum . |
| 4,767,920 | 8/1988 | Kitta et al. . |
| 4,778,983 | 10/1988 | Ushikubo . |
| 4,785,166 | 11/1988 | Kushima . |
| 4,786,790 | 11/1988 | Kruse et al. . |
| 4,797,542 | 1/1989 | Hara . |
| 4,797,920 | 1/1989 | Stein . |
| 4,798,941 | 1/1989 | Watanabe . |
| 4,802,218 | 1/1989 | Wright et al. . |
| 4,803,347 | 2/1989 | Sugahara et al. . |
| 4,811,393 | 3/1989 | Hazard . |
| 4,816,653 | 3/1989 | Anderl et al. . |
| 4,816,654 | 3/1989 | Anderl et al. . |
| 4,825,052 | 4/1989 | Chemin et al. . |
| 4,831,245 | 5/1989 | Ogasawara . |
| 4,833,595 | 5/1989 | Iijima . |
| 4,839,504 | 6/1989 | Nakano . |
| 4,839,792 | 6/1989 | Iijima . |
| 4,849,614 | 7/1989 | Watanabe et al. . |
| 4,853,522 | 8/1989 | Ogasawara . |
| 4,853,961 | 8/1989 | Pastor . |
| 4,874,935 | 10/1989 | Younger . |
| 4,877,945 | 10/1989 | Fujisaki . |
| 4,877,947 | 10/1989 | Mori . |
| 4,879,747 | 11/1989 | Leighton et al. . |
| 4,882,474 | 11/1989 | Anderl et al. . |
| 4,887,234 | 12/1989 | Iijima . |
| 4,891,503 | 1/1990 | Jewell . |
| 4,891,506 | 1/1990 | Yoshimatsu . |
| 4,900,904 | 2/1990 | Wright et al. . |
| 4,901,276 | 2/1990 | Iijima . |
| 4,906,828 | 3/1990 | Halpern . |
| 4,907,270 | 3/1990 | Hazard . |
| 4,926,480 | 5/1990 | Chaum . |
| 4,935,962 | 6/1990 | Austin . |
| 4,949,257 | 8/1990 | Orbach ................................ 364/401 |
| 4,961,142 | 10/1990 | Elliott et al. . |
| 4,969,188 | 11/1990 | Schöbi . |
| 4,977,595 | 12/1990 | Ohta et al. . |
| 4,984,270 | 1/1991 | LaBounty . |
| 4,985,615 | 1/1991 | Iijima . |
| 4,987,593 | 1/1991 | Chaum . |
| 4,993,068 | 2/1991 | Piosenka et al. . |
| 4,995,081 | 2/1991 | Leighton et al. . |
| 4,996,711 | 2/1991 | Chaum . |
| 5,001,753 | 3/1991 | Davio et al. . |
| 5,003,594 | 3/1991 | Shinagawa . |
| 5,005,200 | 4/1991 | Fischer . |
| 5,010,239 | 4/1991 | Mita . |
| 5,012,074 | 4/1991 | Masada . |
| 5,012,076 | 4/1991 | Yoshida . |
| 5,014,312 | 5/1991 | Lisimaque et al. . |
| 5,016,274 | 5/1991 | Micali et al. . |
| 5,038,025 | 8/1991 | Kodera . |
| 5,068,894 | 11/1991 | Hoppe . |
| 5,093,862 | 3/1992 | Scwartz . |
| 5,097,115 | 3/1992 | Ogasawara et al. . |
| 5,120,939 | 6/1992 | Claus et al. . |
| 5,128,997 | 7/1992 | Pailles et al. . |
| 5,131,038 | 7/1992 | Puhl et al. . |
| 5,142,578 | 8/1992 | Matyas et al. . |
| 5,146,499 | 9/1992 | Geffrotin . |
| 5,148,481 | 9/1992 | Abraham et al. . |
| 5,161,231 | 11/1992 | Iijima . |
| 5,162,989 | 11/1992 | Matsuda ................................ 364/401 |
| 5,163,098 | 11/1992 | Dahbura . |
| 5,164,988 | 11/1992 | Matyas et al. . |
| 5,165,043 | 11/1992 | Miyahara et al. . |
| 5,166,503 | 11/1992 | Mizuta . |
| 5,175,416 | 12/1992 | Mansvelt et al. . |
| 5,180,901 | 1/1993 | Hiramatsu . |
| 5,191,193 | 3/1993 | Le Roux . |
| 5,191,608 | 3/1993 | Geronimi . |
| 5,200,999 | 4/1993 | Matyas et al. . |
| 5,201,000 | 4/1993 | Matyas et al. . |
| 5,202,922 | 4/1993 | Iijima . |
| 5,214,702 | 5/1993 | Fischer . |
| 5,224,162 | 6/1993 | Okamoto et al. . |
| 5,243,175 | 9/1993 | Kato . |
| 5,247,578 | 9/1993 | Pailles et al. . |
| 5,293,577 | 3/1994 | Hueske et al. . |
| 5,371,797 | 12/1994 | Bocinsky, Jr. . |
| 5,420,405 | 5/1995 | Chasek . |
| 5,452,431 | 9/1995 | Bournas . |
| 5,473,690 | 12/1995 | Grimonprez et al. . |
| 5,485,520 | 1/1996 | Chaum et al. . |
| 5,511,121 | 4/1996 | Yacobi . |
| 5,517,011 | 5/1996 | Vandenengel . |
| 5,530,232 | 6/1996 | Taylor . |
| 5,534,857 | 7/1996 | Laing et al. . |
| 5,539,825 | 7/1996 | Akiyama et al. . |
| 5,542,081 | 7/1996 | Geronimi . |
| 5,544,246 | 8/1996 | Mandelbaum et al. . |
| 5,546,523 | 8/1996 | Gatto . |
| 5,557,516 | 9/1996 | Hogan . |
| 5,574,269 | 11/1996 | Mori et al. . |
| 5,578,808 | 11/1996 | Taylor . |
| 5,581,708 | 12/1996 | Iijima . |
| 5,588,146 | 12/1996 | Leroux . |
| 5,682,027 | 10/1997 | Bertina et al. . |
| 5,692,132 | 11/1997 | Hogan . |
| 5,699,528 | 12/1997 | Hogan . |
| 5,704,046 | 12/1997 | Hogan . |
| 5,705,798 | 1/1998 | Tarbox . |
| 5,708,780 | 1/1998 | Levergood et al. . |
| 5,715,314 | 2/1998 | Payne et al. . |
| 5,724,424 | 3/1998 | Gifford . |
| 5,796,831 | 8/1998 | Paradinas et al. . |
| 5,825,875 | 10/1998 | Ugon . |
| 5,923,884 * | 7/1999 | Peyret et al. . |
| 5,936,219 * | 8/1999 | Yoshida et al. ................ 235/379 |

FOREIGN PATENT DOCUMENTS

| | | |
|---|---|---|
| 0190733 | 8/1986 | (EP) . |

| | | | | | | |
|---|---|---|---|---|---|---|
| 0218176 | 4/1987 | (EP) . | | 2536928 | 6/1984 | (FR) . |
| 0261030 | 3/1988 | (EP) . | | 2667171 | 12/1992 | (FR) . |
| 0275510 | 7/1988 | (EP) . | | 2687816 | 8/1993 | (FR) . |
| 0292248 | 11/1988 | (EP) . | | 2284689 | 6/1995 | (GB) . |
| 0325506 | 1/1989 | (EP) . | | 64-81084 | 3/1989 | (JP) . |
| 0328289 | 8/1989 | (EP) . | | 2592856 | 12/1996 | (JP) . |
| 0354793 | 2/1990 | (EP) . | | WO8707062 | 11/1987 | (WO) . |
| 0451936 | 10/1991 | (EP) . | | WO8809019 | 11/1988 | (WO) . |
| WO9116691 | 10/1991 | (EP) . | | WO9005960 | 5/1990 | (WO) . |
| 0466969 | 1/1992 | (EP) . | | WO9213322 | 8/1992 | (WO) . |
| 0475837 | 3/1992 | (EP) . | | WO9320538 | 10/1993 | (WO) . |
| 0547741 | 9/1992 | (EP) . | | WO9321612 | 10/1993 | (WO) . |
| 0537756 | 4/1993 | (EP) . | | WO9522810 | 8/1995 | (WO) . |
| 0540095 | 5/1993 | (EP) . | | WO9619771 | 6/1996 | (WO) . |
| 0559205 | 8/1993 | (EP) . | | WO9628795 | 9/1996 | (WO) . |
| 0588339 | 3/1994 | (EP) . | | WO9638825 | 12/1996 | (WO) . |
| 0594493 | 4/1994 | (EP) . | | WO9843212 | 10/1998 | (WO) . |
| 0636998 | 2/1995 | (EP) . | | WO9101538 | 2/1999 | (WO) . |
| 0647902 | 4/1995 | (EP) . | | WO9910824 | 3/1999 | (WO) . |
| 0666550 | 8/1995 | (EP) . | | WO9916031 | 4/1999 | (WO) . |
| 0707290 | 9/1995 | (EP) . | | | | |
| 0686947 | 12/1995 | (EP) . | | | | |
| 0751460 | 1/1997 | (EP) . | | | | |

\* cited by examiner

INTEGRATED CIRCUIT CARD WITH APPLICATION HISTORY LIST

CROSS-REFERENCE TO PRIORITY APPLICATIONS

This application claims the priority of United States Provisional Application No. 60/046,514, filed on May 15, 1997, entitled "Design for a Multi Application Smart Card," and United States Provisional Application No. 60/046,543, filed on May 15, 1997, entitled "Virtual Machine for a Multi Application Smart Card," which are incorporated by reference herein in their entireties.

BACKGROUND OF INVENTION

Integrated circuit (IC) cards are becoming increasingly used for many different purposes in the world today, principally because they are ideal tools for the delivery of distributed, secure information processing at a low cost. An IC card, also called a "smart card," is a card typically the size of a conventional credit card, but which contains a computer chip on the card. The computer chip on the IC card typically includes a microprocessor, read-only-memory (ROM), electrically erasable programmable read-only-memory (EEPROM), a random access memory (RAM), an input/output (I/O) mechanism, and other circuitry to support the microprocessor in its operations. The computer chip can execute one or more applications stored on the card. Examples of applications that IC cards are being used to store and execute include credit/debit, electronic money/purse, telephone calling card, and loyalty reward applications.

When an application is initially loaded onto an IC card, the application may include data that is associated with the application. Such data may include, for example, data that identifies the cardholder, such as the cardholder's name and account number. Additionally, the associated data may also include a promotional or bonus value provided by the application provider to the cardholder for loading the application. For example, with a telephone calling card application, an application provider may provide a certain amount of free calling time. As another example, with an electronic purse application, an application provider may provide bonus electronic cash. As yet another example, with a frequent flyer loyalty application, an application provider may provide free miles.

The use of application data to provide promotional or bonus value creates a potential problem for the IC card manufacturer and the application provider regarding the integrity of loading applications. A solution is needed to prevent a cardholder from intentionally or unintentionally copying an application when it is first loaded, and reloading the application thereafter to reload the value in the data associated with the application. By repeated reloading of an application, a cardholder may potentially obtain an unlimited amount of promotional or bonus value to which he or she is not entitled. At the same time, however, cardholders may be required to reload an application for legitimate reasons, such as for updating an application.

Accordingly, a need exists for a method of loading an application onto an IC card such that a cardholder is prevented from illegitimately reloading an application once it has been loaded onto the IC card.

SUMMARY OF THE INVENTION

In accordance with a preferred embodiment of the present invention, there is provided a method of loading an application copy onto an integrated circuit card, wherein the application copy is one of a plurality of copies of an application. The application copy has an associated application identifier that uniquely identifies the application from other applications and an application copy number that is unique for each copy of the application. The integrated circuit card includes a microprocessor and a memory coupled to the microprocessor. The memory includes an application history list area for storing application identifiers and application copy numbers of applications that have been previously loaded onto the integrated circuit card. The method includes receiving by the integrated circuit card the application copy, the application identifier, and the application copy number; determining by the integrated circuit card whether the application identifier and the application copy number are contained in the application history list area; and failing to load the application copy by the integrated circuit card if the application identifier and the application copy number are contained in the application history list area.

As it is used in this specification and the amended claims, the term "unique" to refer to application copy numbers refers to two types of numbers: (1) non-random numbers that are actually determined to be unique, and (2) random numbers that are determined to be probabilistically unique for a given cardholder.

The method of the present invention may further include the steps of allocating a predetermined portion of the memory for the application history list area; determining by the integrated circuit card whether the application history list area is fall; and failing to load the application copy if the application history list is full.

The method of the present invention may further include the step of adding the application identifier and the application copy number to the application history list area if the application identifier and the application copy number are not contained in the application history list area. Thus, once a copy of an application is loaded onto the integrated circuit card, the application identifier and the application copy number associated with the copy of the application are stored in the application history list area for future checking.

The method of the present invention may also provide a mechanism by which application providers not concerned with repeated loading of applications may circumvent storage of the application identifier and the application copy number in the application history list area. For example, an application copy number of zero can be used to signify that an application may be reloaded as often as desired. Accordingly, the method of the present invention may further include the step of adding the application identifier and the application copy number to the application history list area if the application identifier and the application copy number are not contained in the application history list area and the application copy number is not zero.

The application copy may include both application code and application data. The application identifier and the application copy number may be contained in the application data.

Preferably, the application copy, the application identifier, and the application copy number are transmitted to the integrated circuit card by an application provider. Preferably, before transmitting the application copy to the integrated circuit card, the application provider encrypts at least a portion of the application copy. It is also preferred that an application provider transmit a key transformation unit, which includes information relating to the encryption of the encrypted portion of the application copy. It is further preferred that the integrated circuit card has a first public key pair and that the application provider encrypts the key transformation unit with the public key of the first public key pair before transmitting the key transformation unit to the integrated circuit card.

When the application provider encrypts the key transformation unit with the public key of the first public key pair, the integrated circuit card may decrypt the encrypted key transformation unit with the secret key of the first public key pair. Once the key transformation unit is decrypted, the integrated circuit card may decrypt the application copy using the information contained in the decrypted key transformation unit.

It is also preferred that the application provider has a second public key pair and that the application provider form a signed application copy by encrypting the application copy with the secret key of the second public key pair. The application provider may then transmit both the application copy and the signed application copy to the integrated circuit card.

It is further preferred that the application provider register the public key of the second public key pair with a certification authority, which has a third public key pair. The certification authority may then provide a certificate to the application provider by encrypting the public key of the second public key pair with the secret key of the third public key pair. The application provider may transmit the certificate to the integrated circuit card.

When a certificate is transmitted to the integrated circuit card, the integrated circuit card may obtain the public key of the second key pair by decrypting the certificate using the public key of the third public key pair. The integrated circuit card may then verify the signed application copy using the public key of the second public key pair. The integrated circuit card may fail to load the application copy if the signed application copy is not verified.

In accordance with another preferred embodiment of the present invention, there is provided an integrated circuit card that includes a microprocessor and a memory coupled to the microprocessor. The memory includes an application history list area for storing application identifiers and application copy numbers, each application identifier and each application copy number being associated with an application copy. The application copy is one of a plurality of copies of an application. Each application identifier uniquely identifies an application from other applications, and each application copy number uniquely identifies an application copy from other application copies. The integrated circuit card of the invention further includes means for determining whether an application identifier and an application copy number associated with an application copy to be loaded into the memory area are contained in the application history list area and means for failing to load the application copy to be loaded if the associated application identifier and the associated application copy number are contained in the application history list area.

DETAILED DESCRIPTION OF THE INVENTION

Figure 1:
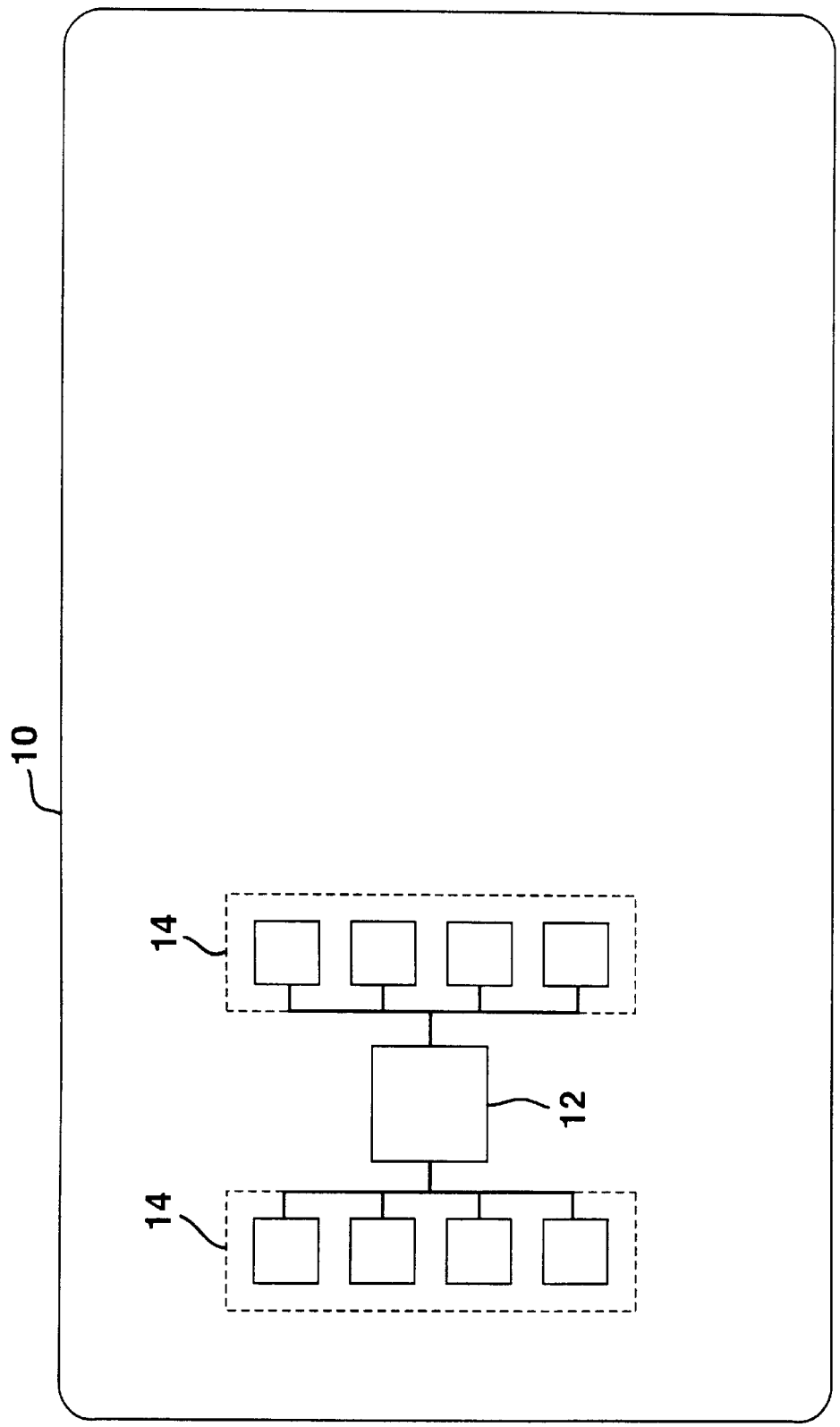
FIG. 1 is a schematic representation of an IC card in accordance with a preferred embodiment of the present invention.

FIG. 1 provides a schematic representation of a typical IC card 10 that can be used with the presently claimed invention. The IC card 10 includes an integrated circuit 12 having one or more electrical contacts 14 connected to the integrated circuit 12.

Figure 2:
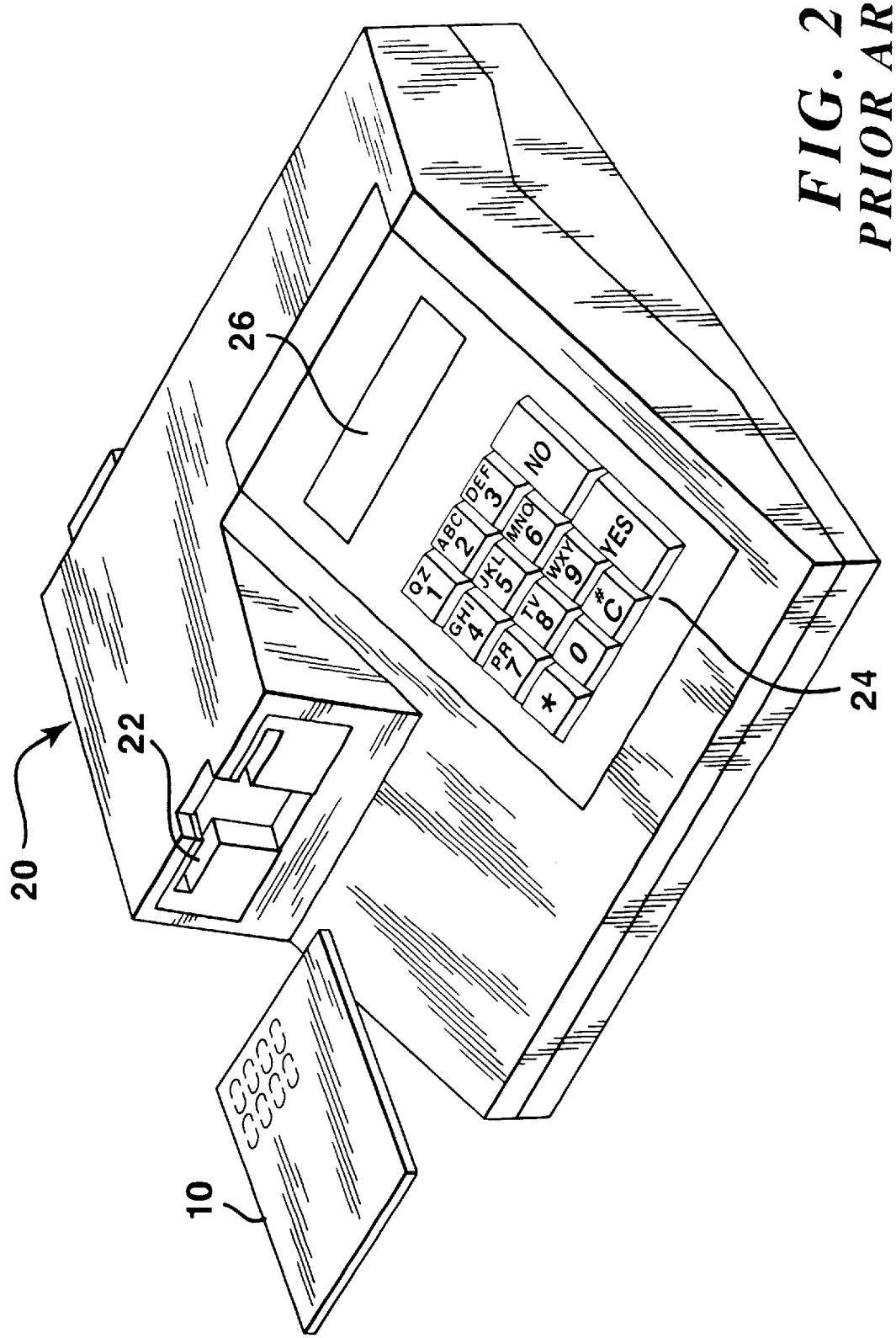
FIG. 2 is a perspective view of an IC card and terminal in accordance with a preferred embodiment of the present invention.

FIG. 2 shows an example of a device with which the IC card 10 communicates. As used in this specification and the appended claims, the terms "interface device" and "terminal" shall be used to generically describe devices with which an IC card may communicate. A typical terminal 20, as shown in FIG. 2, includes a card reader 22, a keypad 24, and a display 26. The keypad 24 and the display 26 allow a user of the IC card 10 to interact with the terminal. The keypad 24 allows the user to select a transaction, to enter a personal identification number ("PIN"), and to enter transactional information. The display 26 allows the user to receive informational messages and prompts for data entry. Other types of terminals may include IC card-compatible ATM machines and telephones.

Figure 3:
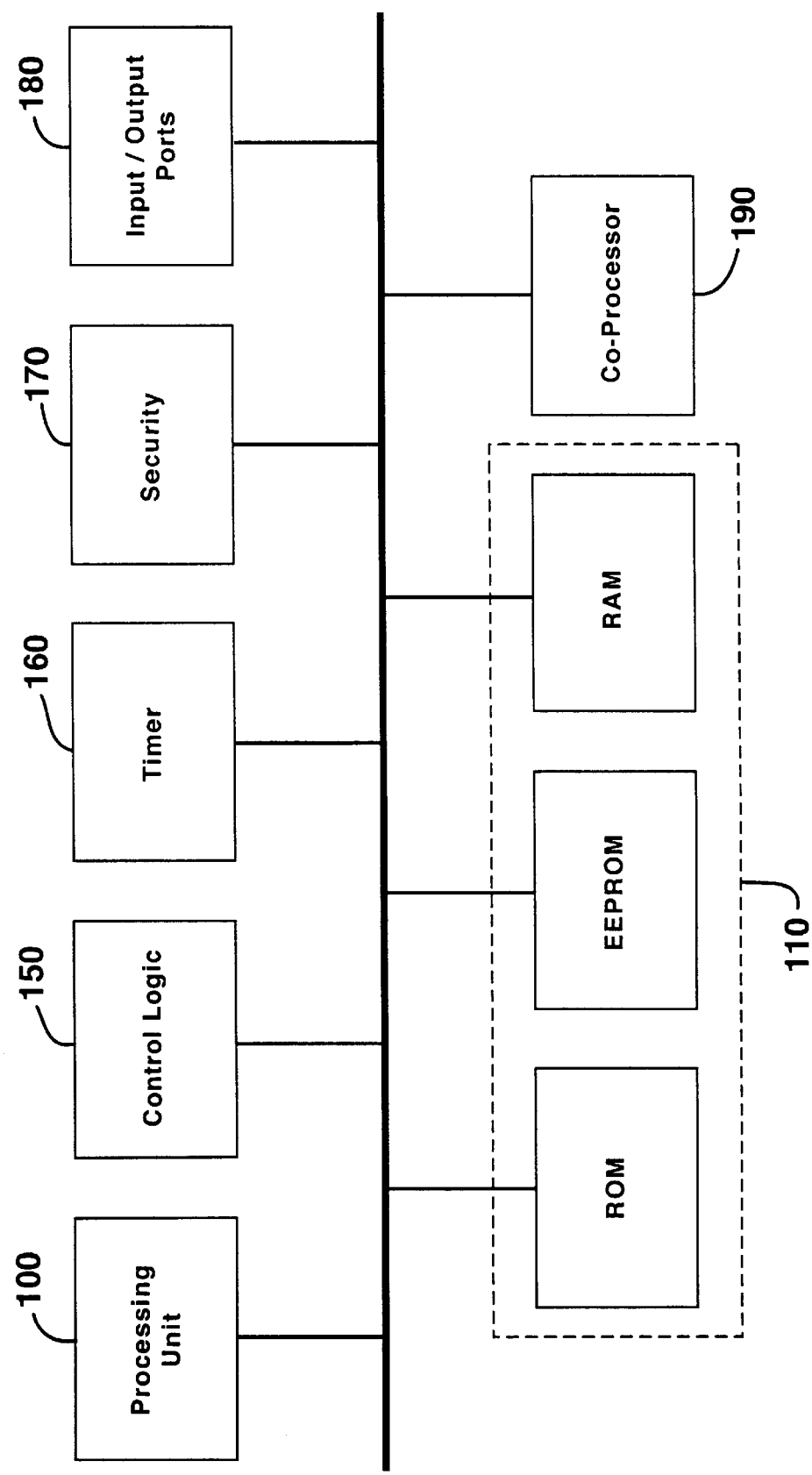
FIG. 3 is a functional block diagram of an IC card in accordance with a preferred embodiment of the present invention.

FIG. 3 provides a functional block diagram of the integrated circuit 12. At a minimum, the integrated circuit 12 includes a processing unit 100 and a memory unit 110. Preferably, the integrated circuit 12 also includes control logic 150, a timer 160, security circuitry 170, input/output ports 180, and a co-processor 190. The control logic 150 provides, in conjunction with the processing unit 100, the control necessary to handle communications between the memory unit 110 and input/output ports 180. The timer 160 provides a timing reference signal for the processing unit 100 and the control logic 150. The security circuitry 170 preferably provides fusible links that connect the input/output ports 180 to internal circuitry for testing during manufacturing. The fusible links are burned after completion of testing to limit later access to sensitive circuit areas. The co-processor 190 provides the ability to perform complex computations in real time, such as those required by cryptographic algorithms.

The memory unit 110 may include different types of memory, such as volatile and non-volatile memory and read-only and programmable memory. For example, as shown in FIG. 3, the memory unit 110 may include read-only memory (ROM), electrically erasable programmable read-only memory (EEPROM), and random-access memory (RAM).

The memory unit 110 stores IC card data such as secret cryptographic keys and a user PIN. The secret cryptographic keys may be any type of well-known cryptographic keys, such as the private keys of public-key pairs. Preferably, the secret cryptographic keys are stored in a secure area of ROM or EEPROM that is either not accessible or has very limited accessibility from outside the IC card.

The memory unit 110 also stores the operating system of the IC card. The operating system loads and executes IC card applications and provides file management and other basic card services to the IC card applications. Preferably, the operating system is stored in ROM.

In addition to the basic services provided by the operating system, the memory unit 110 may also include one or more IC card applications. For example, if the IC card is to be used as an electronic cash card, an application called MONDEX™ PURSE (from Mondex International Limited) might be included on the IC card, which loads an electronic value of a certain currency from a user's account in a financial institution onto the IC card. Preferably, the operating system of the IC card 10 should support multiple applications, such as the MULTOS™ operating system from Mondex International Limited.

An IC card application may include both program and associated data files, which are typically stored in EEPROM. The application program may be written either in the native programming code of the processing unit 100 or it may be written in a higher level language that must be translated before it is executed on the processing unit 100. An example of such a higher level language for use on IC cards is the MULTOS™ Executable Language (MEL). Advantageously, by using a higher level language such as MEL, an application program is capable of running on multiple hardware platforms without any need for re-writing.

Because IC cards typically have limited memory capacity due to the size and cost restraints of placing memory on the IC cards, an IC card may also have primitives stored in ROM, which are subroutines that perform frequently used functions or procedures, such as mathematical functions. The primitives are usually written in the native language of the processing unit 100 so that they can be executed very quickly.

Figure 4:
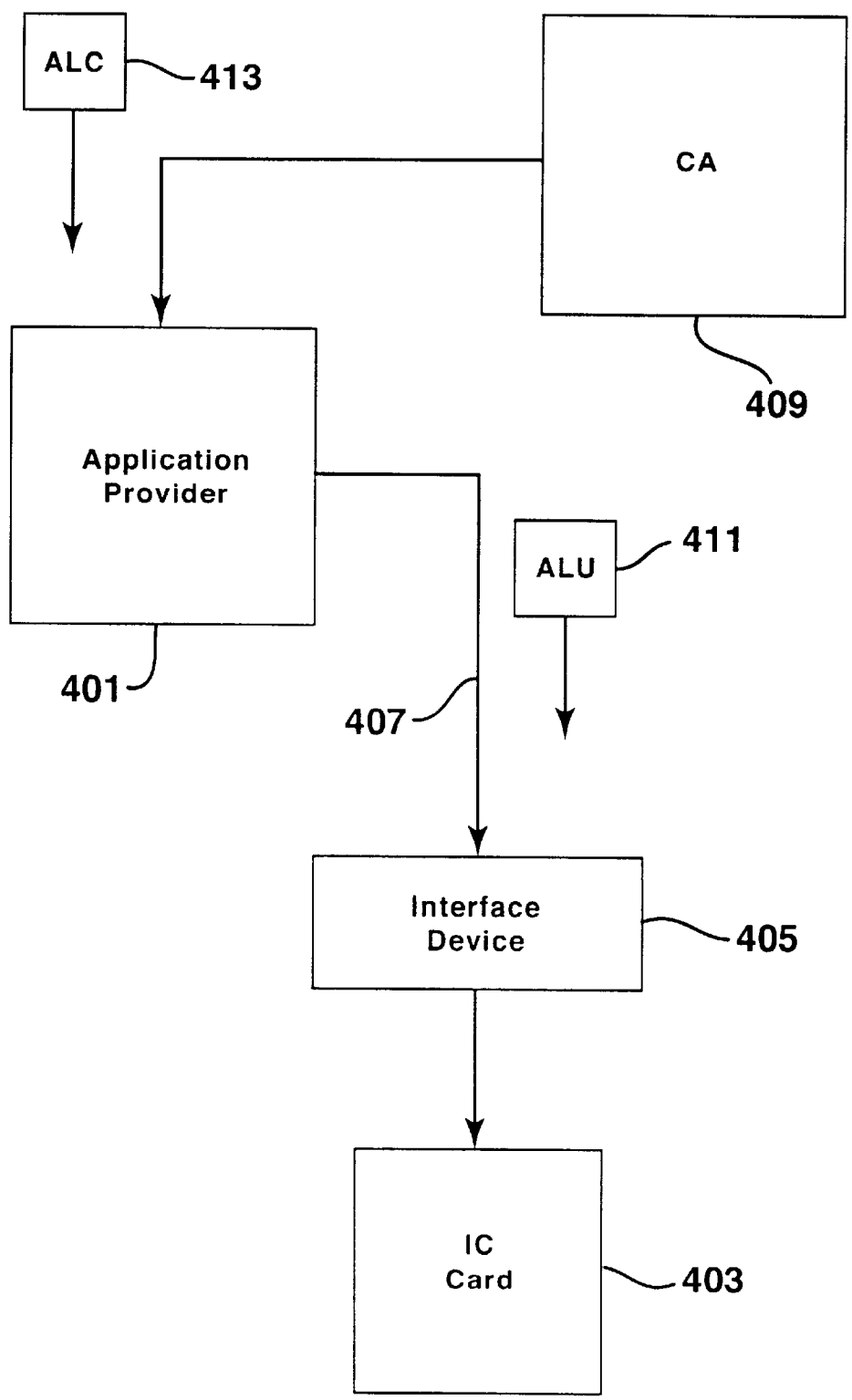
FIG. 4 is a diagram of a system for remotely loading an application from an application provider onto an IC card in accordance with a preferred embodiment of the present invention.

In FIG. 4, there is shown a diagram of a system for remotely loading an application from an application provider 401 onto an IC card 403. The application provider 401 may be a card issuer, a bank, or any other entity that provides application loading services. The IC card 403 communicates with the application provider 401 through an interface device 405, which may be a bank terminal, an ATM, or any other device that communicates with an IC card. The application provider 401 and the interface device 405 communicate by way of a data conduit 407, which can be a telephone line, a cable line, a satellite link, an Internet connection, an intra-net connection, or any other type of communications link.

When loading applications onto an IC card remotely, an application provider is required to address several security issues. First, an application provider must ensure that an application is sent only to the cardholder who is intended to receive the application. Second, the application provider must ensure the privacy of any confidential or trade secret information contained in the applications to be loaded. Third, because the data conduit 407 may be an open link and subject to third parties possibly intercepting or replacing applications being transmitted, an application provider must take security measures to enable the IC card to authenticate the application.

The solutions to these security issues typically involve encryption using symmetric and/or asymmetric cryptography techniques. Symmetric cryptography involves encoding and decoding data using the same mathematical number, called a "key," which must be kept secret. On the other hand, asymmetric cryptography, or "public key" cryptography as it is also called, involves encoding data with one key and decoding data with another key. The two keys are referred to as a key pair, and one of the key pair must be kept secret while the other of the key pair may be publicly distributed. Each key of a key pair may be used to encode data; however, once data is encoded by using one key, it can only be decoded by using the other key.

In the system of FIG. 4, it is assumed that the application provider 401 and the IC card 403 each have cryptographic key pairs. The generation of cryptographic keys is performed by any manner known by those skilled in the art. The system also utilizes a Certification Authority (CA) 409, which also has a cryptographic key pair. The CA 409 may be any entity that is trusted to keep the secret key of its public key pair private and to authenticate the identity of other entities—as, for example, the identity of the application provider 401.

In the system of FIG. 4, the application provider 401 applies for registration of its public key with the CA 409. To do so, the application provider 401 must meet the identification requirements of the CA 409. If the application provider 401 meets these identification requirements, the CA 409 will issue an Application Load Certificate (ALC) 413, which includes the public key of the application provider 401 encoded or "signed" by the secret key of the CA 409. The ALC 413 may be decoded using the public key of the CA 409, which is publicly distributed. Since the CA 409 is trusted to keep its secret key private and to authenticate the identity of the application provider 401, any entity receiving the ALC 413 is assured that the public key contained within the certificate belongs to the application provider 401.

Figure 5:
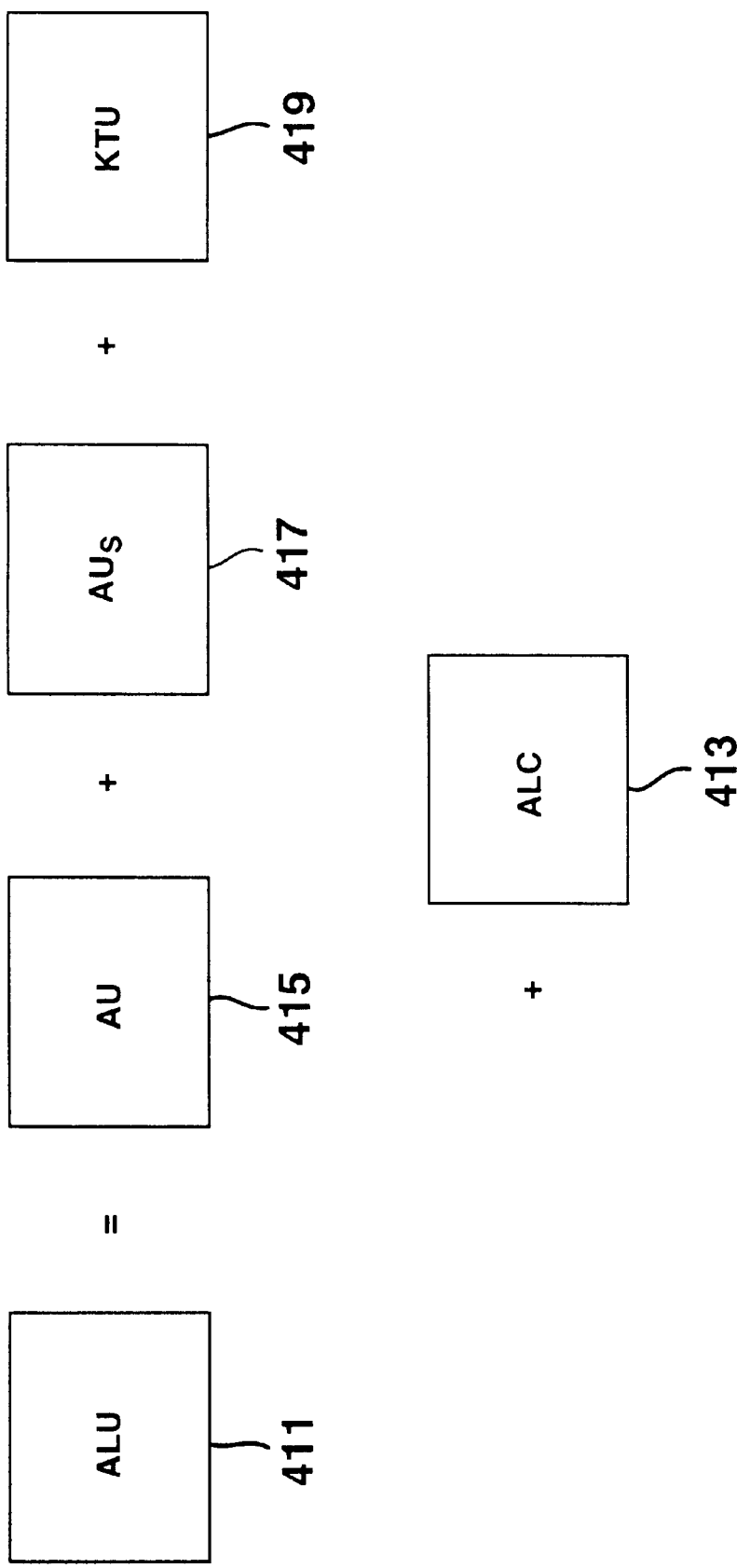
FIG. 5 is a schematic representation of an application load unit in accordance with a preferred embodiment of the present invention.

To load an application onto the IC card 403, the application provider 401 transmits an Application Load Unit (ALU) 411 to the interface device 405 via the data conduit 407. The contents of the ALU 411 are shown schematically in FIG. 5. The ALU preferably includes an Application Unit (AU) 415, a signed Application Unit ($AU_s$) 417, a Key Transformation Unit (KTU) 419, and the ALC 413.

The AU 415 contains the application code and data that are to be stored on the IC card. Some or all of the application code and data may be encrypted to protect confidential or trade secret portions of the application code and data.

The $AU_s$ 417 is the application code and data AU 415 signed with the secret key of the application provider 401. Using the public key of the application provider 401 provided in the ALC 413, the IC card 403 may decode the $AU_s$ 417 and compare it to the AU 415 to ensure that the AU 415 has not been tampered with during transmission.

The KTU 419 contains information relating to the encrypted portions of the AU 415. This information allows the IC card 403 to decode those encrypted portions so that the application code and data can be accessed by the IC card 403. The KTU 419 is signed with the public key of the IC card 403, which ensures that only the intended IC card 403 can decode the KTU 419 (using the IC card's secret key). Once the KTU 419 is decoded, the IC card 403 may use the information contained in the KTU 419 to decode the encrypted portions of the application code and data of AU 415.

Figure 6:
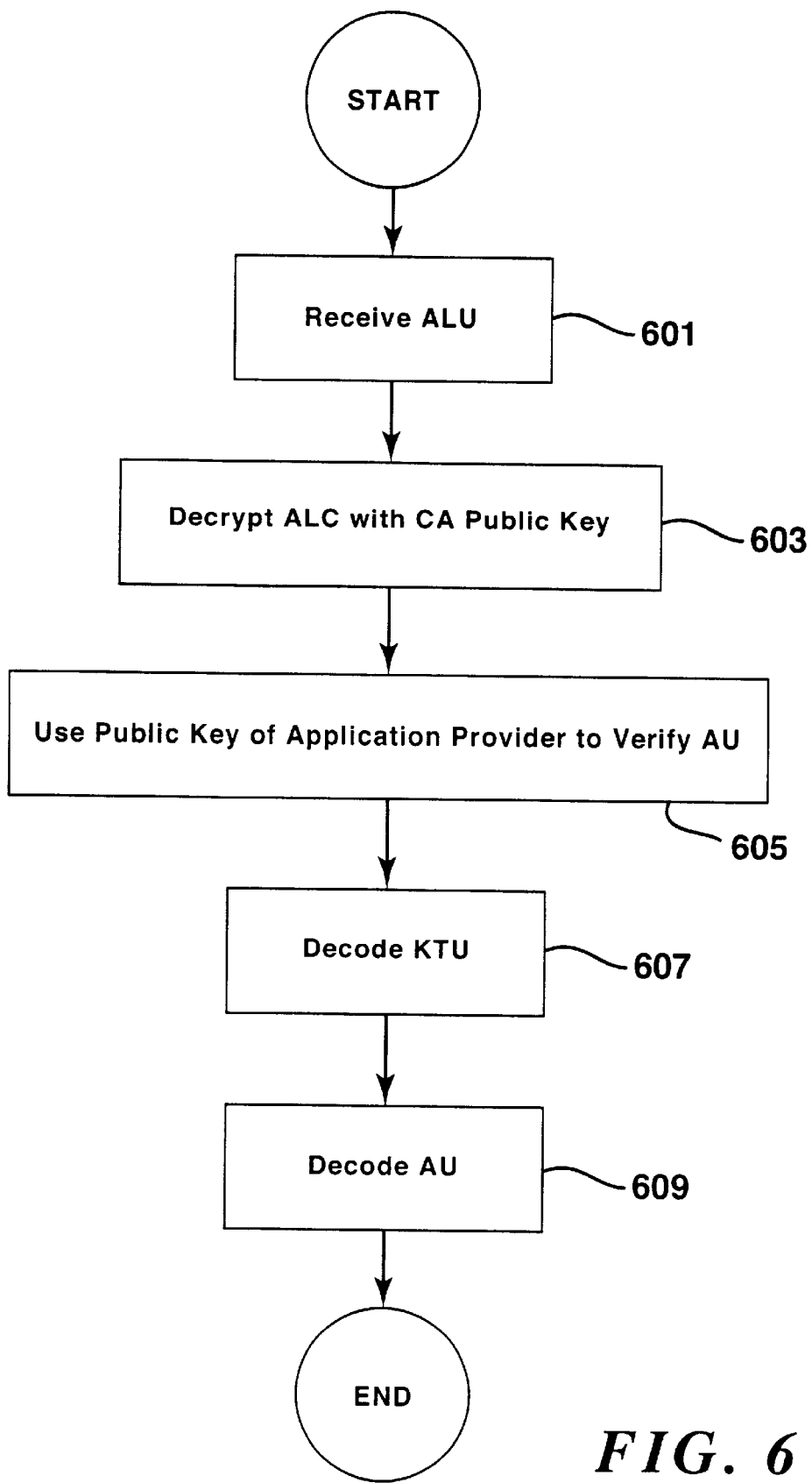
FIG. 6 is a flowchart of exemplary steps for processing the application load unit of FIG. 5 in accordance with a preferred embodiment of the present invention.

FIG. 6 shows a flow chart of the steps for processing the ALU 411 when it is received by the IC card 403. In step 601, the IC card 403 receives the ALU 411 from the application provider 401. The ALU 411 is placed in the EEPROM of the IC card 403 along with header information indicating the location in memory of AU 415, $AU_s$ 417, KTU 419 and ALC 413.

In step 603, the ALC 413 is decoded using the public key of the CA 409. The IC card 403 preferably stores in its memory a copy of the CA public key because it may be used in many transactions. Alternatively, the IC card could obtain the public key from a trusted storage location, such as the interface device 405. Once decoded, the ALC 413 provides the IC card 403 with a trusted copy of the public key of the application provider 401.

In step 605, the IC card 403 uses the application provider's public key to verify the AU 415 was not tampered with during transmission. Using the public key of the application provider 401, the IC card 403 decodes the $AU_s$ 417, which was signed with the secret key of the application provider 401. Once the $AU_s$ 417 is decoded, the decoded $AU_s$ 417 is compared to the AU 415. If the two units match, then the AU 415 is verified.

In step 607, the KTU 419, which has been encrypted with the public key of the IC card 403, is decoded using the private key of the IC card 403. In step 609, the information in the decoded KTU 419 is used to decode the encrypted portions of the AU 415. The KTU 419 may contain, for example, either an algorithm or a key for use in decoding the AU 415.

In addition to the security and authentication measures discussed above, other security and authentication measures may also be employed. Additional methods of security and authentication have been addressed, for example, in the related patent applications entitled, "Secure Multi-Application IC Card System Having Selective Loading and Deleting Capability," by Everett et al., filed Feb. 12, 1998, and "Key Transformation Unit for an IC Card," by Richards et al., filed May 11, 1998. Both of these applications are hereby incorporated by reference.

In accordance with a preferred embodiment of the present invention, the data portion of the AU 415 includes an application identifier for the application to be loaded onto the IC card 403 and an application copy number, which is unique for each copy of an application to be loaded onto the IC card 403. As it is used in this specification and the amended claims, the use of the term "unique" in relation to application copy numbers refers both to non-random numbers that are actually determined to be unique and to random numbers that are determined to be probabilistically unique for a given IC card. Preferably, the data portion of the AU 415 containing the application identifier and the application copy number is encoded (and the KTU 419 contains the information necessary to decode this data portion).

Figure 7A:
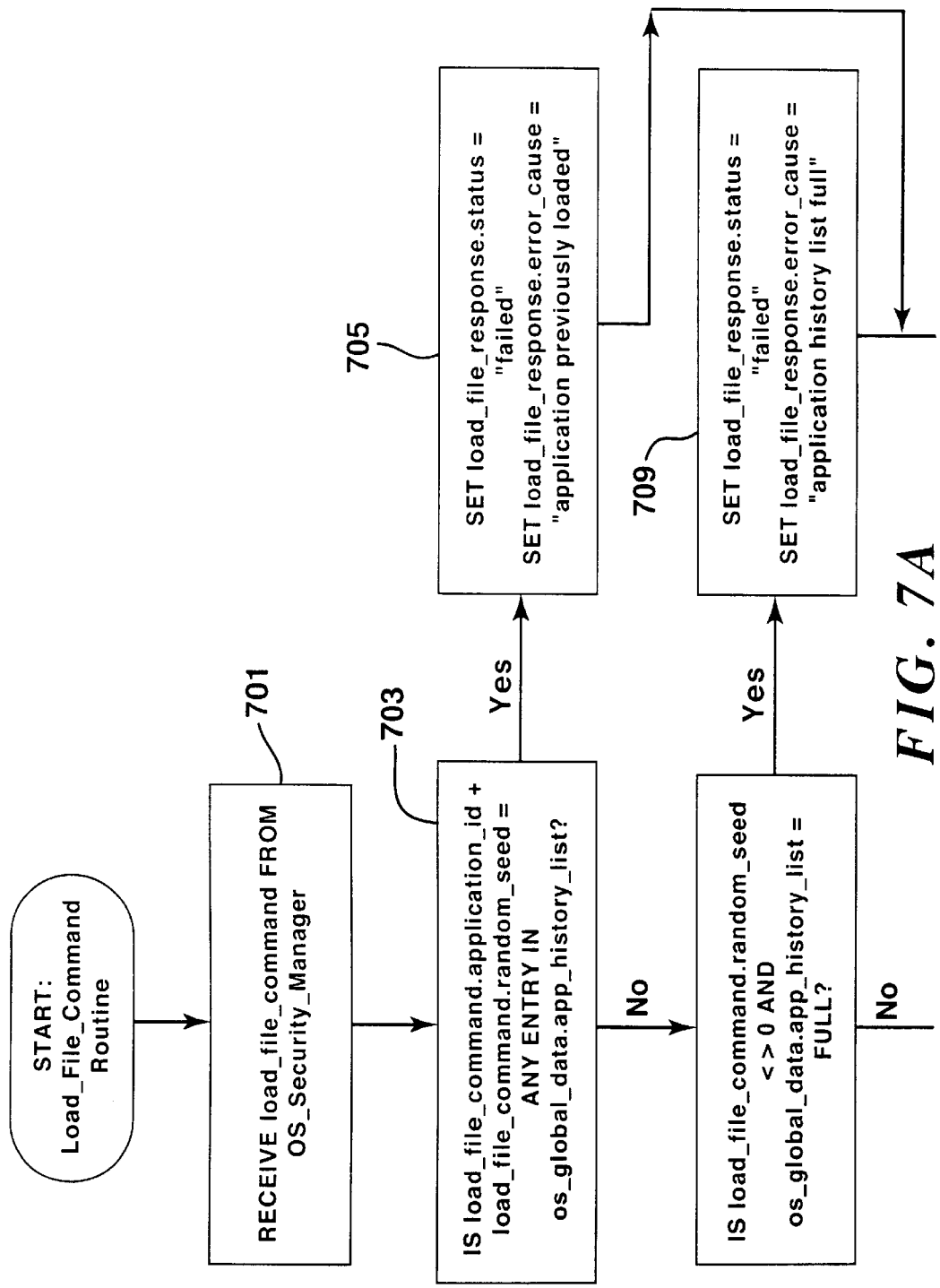
FIG. 7 is a flowchart illustrating exemplary steps of a file loading routine, which may be implemented by the operating system of an IC card in accordance with a preferred embodiment of the present invention.
Figure 7B:
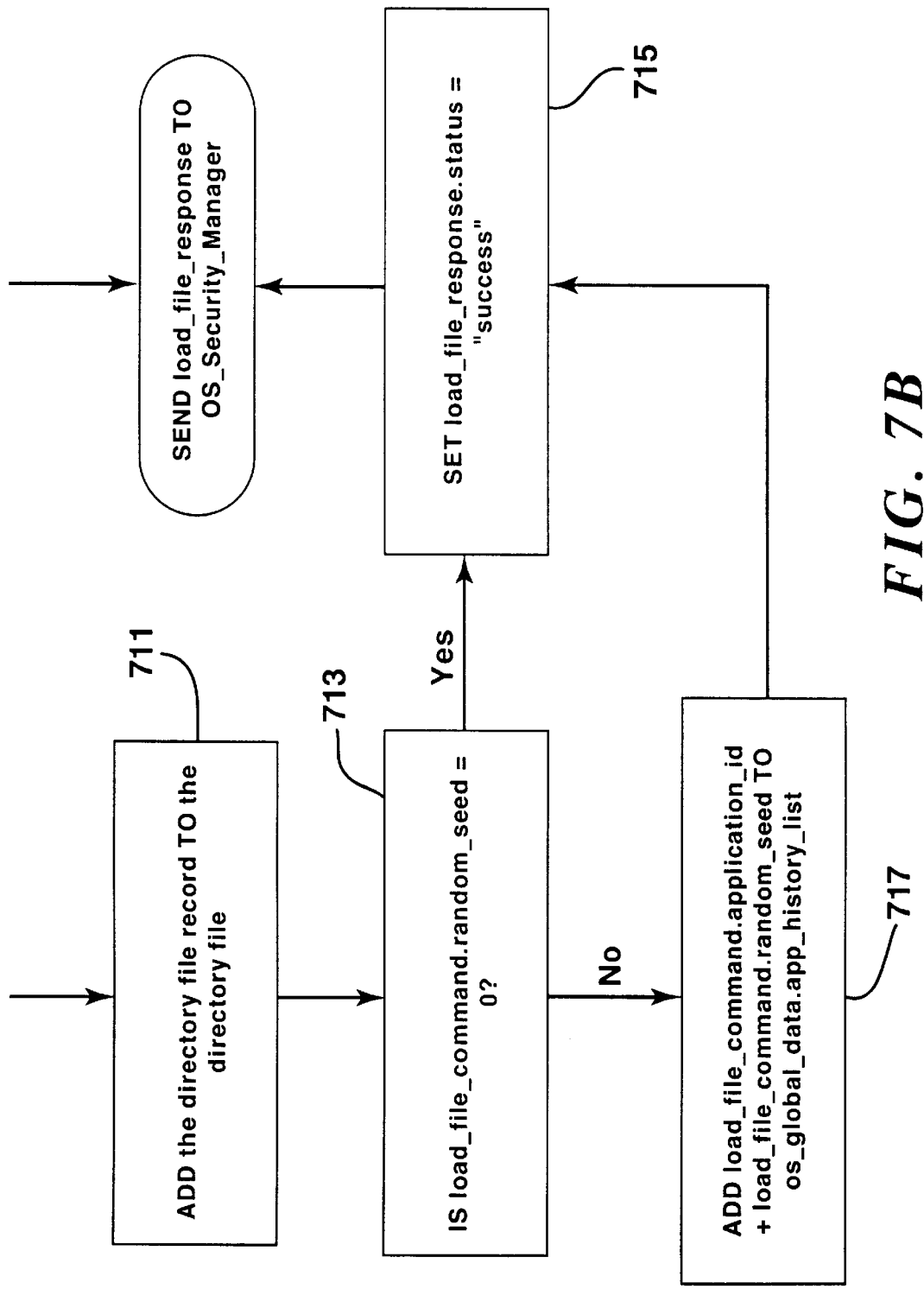

FIG. 7 is a flowchart illustrating the steps of a file loading routine that may be implemented by the operating system of the IC card 403 to take advantage of the application identifier and the application copy number contained in the AU 415 to prevent a cardholder from repeatedly loading the same application onto the IC card 403. In the embodiment of FIG. 7, the application copy number is a random number, also called a "random seed." In step 701, the file loading routine receives the file loading command load_file_ command from the security manager of the operating system, OS_Security_Manager. The OS_Security_ Manager of the operating system is responsible for verification and decoding of the ALU 411 as discussed with regard to FIG. 6.

In step 703, the application identifier and random seed associated with the application, referred to as load_file_ command.application_id and load_file_ command.random_seed, respectively, are checked against entries in an application history list stored on the IC card, referred to as os_global_data.app_history_list. The application history list contains entries for each set of application identifier and random seed associated with an application loaded onto the IC card 403. It is preferred that the application history list be stored in a secure area of EEPROM that is not accessible from outside the IC card.

If the application identifier and random seed associated with the application to be loaded are found in the application history list, in step 705, the response status load_file_ response.status is set to "failed" and the error description load_file_response.error_cause is set to "application previously loaded." The error response load_file_response is returned to the OS_Security_Manager, indicating that the load file routine failed to load the application because the application had previously been loaded onto the IC card.

If the application identifier and random seed associated with the application to be loaded are not found in the application history list, in step 707, the random seed is checked to determine whether it is equal to zero and the application history list is checked to determine whether it is full. A random seed with a value of zero indicates that the application does not contain any economic value included in its data, and thus may be reloaded as often as desired. If the random seed associated with the application is not zero (indicating there is an economic value included with the application) and the application history list is full, the response status load_file_response.status is set to "failed" and the error description load_file_response.error_cause is set to "application history list full." In this case, the application cannot be loaded because the application history list is full and, therefore, the application identifier and random seed cannot be added to the application history list for future checking.

If an error condition has not been triggered in steps 703 or 707, in step 711, the directory file record associated with the application is added to the directory file of the IC card—i.e., the application is loaded onto the IC card 403. In step 713, it is checked whether the random seed is equal to zero. If the random seed is not equal to zero (indicating that there is an economic value included with the application), the application identifier and the random seed are added to the application history list for checking against subsequent applications sought to be loaded onto the IC card. After updating the application history list, the response status load_file_response.status is set to "success" and sent to the OS_Security_Manager.

If the random seed is equal to zero (indicating that there is no economic value included with the application), the application identifier and random seed are not added to the application history list. Instead, step 717 is skipped, and the response status load_file_response.status is set to "success" and sent to the OS_Security_Manager.

Advantageously, the file loading routine of FIG. 7 prevents a cardholder from illegitimately reloading an application. If a cardholder intercepts and copies an application to be loaded onto an IC card, the cardholder cannot later reload the application because, once the application is loaded, the application identifier and random seed are stored permanently on the IC card. If a cardholder attempts to reload the application, the operating system of the IC card will fail to reload the application because the application identifier and random seed of the application will match an entry in the application history list of the IC card.

On the other hand, a cardholder is not prevented from legitimately reloading an application from an application provider. Since an application provider will generate a new random seed for each copy of an application it provides, it will be unlikely for a cardholder to receive a second copy of the application from the application provider with the same random seed. Of course, the application provider must use a random seed of sufficient length to ensure that the probability of any cardholder twice receiving the same random seed is sufficiently unlikely.

Alternatively, instead of using a random number, an application provider may use any unique number associated with copies of applications it provides to each cardholder. For example, an application provider may keep a counter that tracks the number of copies of an application that is has provided. The application provider may use the value of the counter to provide a unique number each time it provides a copy of the application to a cardholder. The random seed embodiment is preferred, however, because it is easier to manage (i.e., there is no information that is required to be stored or managed).

Although the present invention has been described with reference to certain preferred embodiments, various modifications, alterations, and substitutions will be known or obvious to those skilled in the art without departing from the spirit and scope of the invention, as defined by the appended claims.

We claim:

1. A method of loading an application copy onto an integrated circuit card, wherein said application cop'y comprises application code and application data and a portion of said application data comprises units of value that may be exchanged for goods or services, and wherein said application copy is one of a plurality of copies of an application, said application copy having an associated application identifier that uniquely identifies said application from other applications and an application copy number that is unique for each copy of said application, said integrated circuit card comprising a microprocessor and memory coupled to said microprocessor, said memory comprising an application history list area for storing application identifiers and application copy numbers of applications that have been previously loaded onto said integrated circuit card, said method comprising:

receiving by said integrated circuit card said application copy, said application identifier, and said application copy number;

determining by said integrated circuit card whether said application identifier and said application copy number are contained in said application history list area; and failing to load said application copy by said integrated circuit card if said application identifier and said application copy number are contained in said application history list area;

transmitting said application copy, said application identifier, and said application copy number to said integrated circuit card by an application provider;

encrypting by said application provider at least a portion of said application copy before transmitting said application copy to said integrated circuit card;

transmitting by said application provider a key transformation unit comprising information relating to the encryption of said portion of said application copy;

wherein said integrated circuit card has a first public key pair, and further comprising the steps of:

encrypting said key transformation unit by said application provider with the public key of said first public key pair before transmitting said key transformation unit to said integrated circuit card;

decrypting by said integrated circuit card said encrypted key transformation unit with the secret key of said first public key pair; and decrypting said application copy using the information contained in said decrypted key transformation unit;

wherein said application provider has a second public key pair, and further comprising the steps of:

forming a signed application copy by said application provider by encrypting said application copy with the secret key of said second public key pair; and transmitting by said application provider said signed application copy to said integrated circuit card;

registering the public key of said second public key pair with a certification authority, which has a third public key pair;

providing a certificate by said certification authority to said application provider by encrypting the public key of said second public key pair with the secret key of said third public key pair; and transmitting said certificate by said application provider to said integrated circuit card;

obtaining the public key of said second key pair by said integrated circuit card by decrypting said certificate using the public key of said third public key pair;

verifying by said integrated circuit card said signed application copy using the public key of said second public key pair; and failing to load said application copy by said integrated circuit card if said signed application copy is not verified.

2. The method of claim 1, further comprising the steps of:

allocating a predetermined portion of said memory for said application history list area;

determining by said integrated circuit card whether said application history list area is full; and failing to load said application copy if said application history list is full.

3. The method of claim 1, further comprising the step of:

adding said application identifier and said application copy number to said application history list area if said application identifier and said application copy number are not contained in said application history list area.

4. The method of claim 1, further including the step of:

adding said application identifier and said application copy number to said application history list area if said application identifier and said application copy number are not contained in said application history list area and said application copy number is not zero.

5. The method of claim 1, wherein said application copy comprises application code and application data and wherein said application identifier and said application copy number are contained in said application data.

* * * * *